United States Patent
Erbas et al.

(10) Patent No.: US 11,410,646 B1
(45) Date of Patent: Aug. 9, 2022

(54) PROCESSING COMPLEX UTTERANCES FOR NATURAL LANGUAGE UNDERSTANDING

(71) Applicant: Amazon Technologies, Inc., Seattle, WA (US)

(72) Inventors: Cengiz Erbas, Acton, MA (US); Thomas Kollar, San Jose, CA (US); Avnish Sikka, Acton, MA (US); Spyridon Matsoukas, Hopkinton, MA (US); Simon Peter Reavely, Lexington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 562 days.

(21) Appl. No.: 16/368,399

(22) Filed: Mar. 28, 2019

Related U.S. Application Data

(62) Division of application No. 15/280,430, filed on Sep. 29, 2016, now abandoned.

(51) Int. Cl.
*G10L 15/22* (2006.01)
*G10L 15/06* (2013.01)
*G10L 15/02* (2006.01)
*G10L 15/18* (2013.01)

(52) U.S. Cl.
CPC .............. *G10L 15/22* (2013.01); *G10L 15/02* (2013.01); *G10L 15/063* (2013.01); *G10L 15/1822* (2013.01); *G10L 2015/223* (2013.01)

(58) Field of Classification Search
CPC .......................... G10L 2015/223; G10L 15/22
See application file for complete search history.

(56) References Cited

U.S. PATENT DOCUMENTS

| | | | | |
|---|---|---|---|---|
| 5,345,538 | A * | 9/1994 | Narayannan | G10L 15/26 704/270 |
| 9,171,546 | B1 * | 10/2015 | Pike | H04M 3/50 |
| 10,276,149 | B1 * | 4/2019 | Liang | G10L 13/033 |
| 10,657,961 | B2 * | 5/2020 | Cash | H04W 4/02 |
| 10,769,385 | B2 * | 9/2020 | Evermann | G06F 40/35 |
| 11,017,772 | B1 * | 5/2021 | Gill | G10L 15/22 |

(Continued)

FOREIGN PATENT DOCUMENTS

| | | | | |
|---|---|---|---|---|
| CN | 109557850 A | * | 4/2019 | |
| WO | WO-2015124259 A1 | * | 8/2015 | ......... B60R 16/0373 |

*Primary Examiner* — Matthew H Baker
(74) *Attorney, Agent, or Firm* — Pierce Atwood LLP

(57) ABSTRACT

A system capable of performing natural language understanding (NLU) on utterances including complex command structures such as sequential commands (e.g., multiple commands in a single utterance), conditional commands (e.g., commands that are only executed if a condition is satisfied), and/or repetitive commands (e.g., commands that are executed until a condition is satisfied). Audio data may be processed using automatic speech recognition (ASR) techniques to obtain text. The text may then be processed using machine learning models that are trained to parse text of incoming utterances. The models may identify complex utterance structures and may identify what command portions of an utterance go with what conditional statements. Machine learning models may also identify what data is needed to determine when the conditionals are true so the system may cause the commands to be executed (and stopped) at the appropriate times.

20 Claims, 10 Drawing Sheets

(56) References Cited

U.S. PATENT DOCUMENTS

| | | | | |
|---|---|---|---|---|
| 11,132,173 | B1* | 9/2021 | Borelli | G10L 21/10 |
| 2008/0046250 | A1* | 2/2008 | Agapi | G10L 15/075 |
| | | | | 704/275 |
| 2013/0110349 | A1* | 5/2013 | Tseng | B60W 50/087 |
| | | | | 701/36 |
| 2013/0344788 | A1* | 12/2013 | Buch | H05B 1/0236 |
| | | | | 454/75 |
| 2014/0172953 | A1* | 6/2014 | Blanksteen | H04L 29/08936 |
| | | | | 709/203 |
| 2015/0019229 | A1* | 1/2015 | Fish | H04M 1/72454 |
| | | | | 704/275 |
| 2015/0154976 | A1* | 6/2015 | Mutagi | H04L 12/281 |
| | | | | 704/275 |
| 2015/0204561 | A1* | 7/2015 | Sadwick | F24F 11/30 |
| | | | | 236/1 C |
| 2017/0236512 | A1* | 8/2017 | Williams | H04R 3/12 |
| | | | | 381/79 |
| 2017/0357637 | A1* | 12/2017 | Nell | H04L 12/2823 |
| 2018/0270576 | A1* | 9/2018 | Chua | H04L 12/282 |
| 2019/0074003 | A1* | 3/2019 | Guthery | G10L 15/285 |
| 2020/0186378 | A1* | 6/2020 | Six | G06F 3/04817 |
| 2021/0035575 | A1* | 2/2021 | An | G10L 17/24 |
| 2021/0151050 | A1* | 5/2021 | Liu | G05B 19/402 |

* cited by examiner

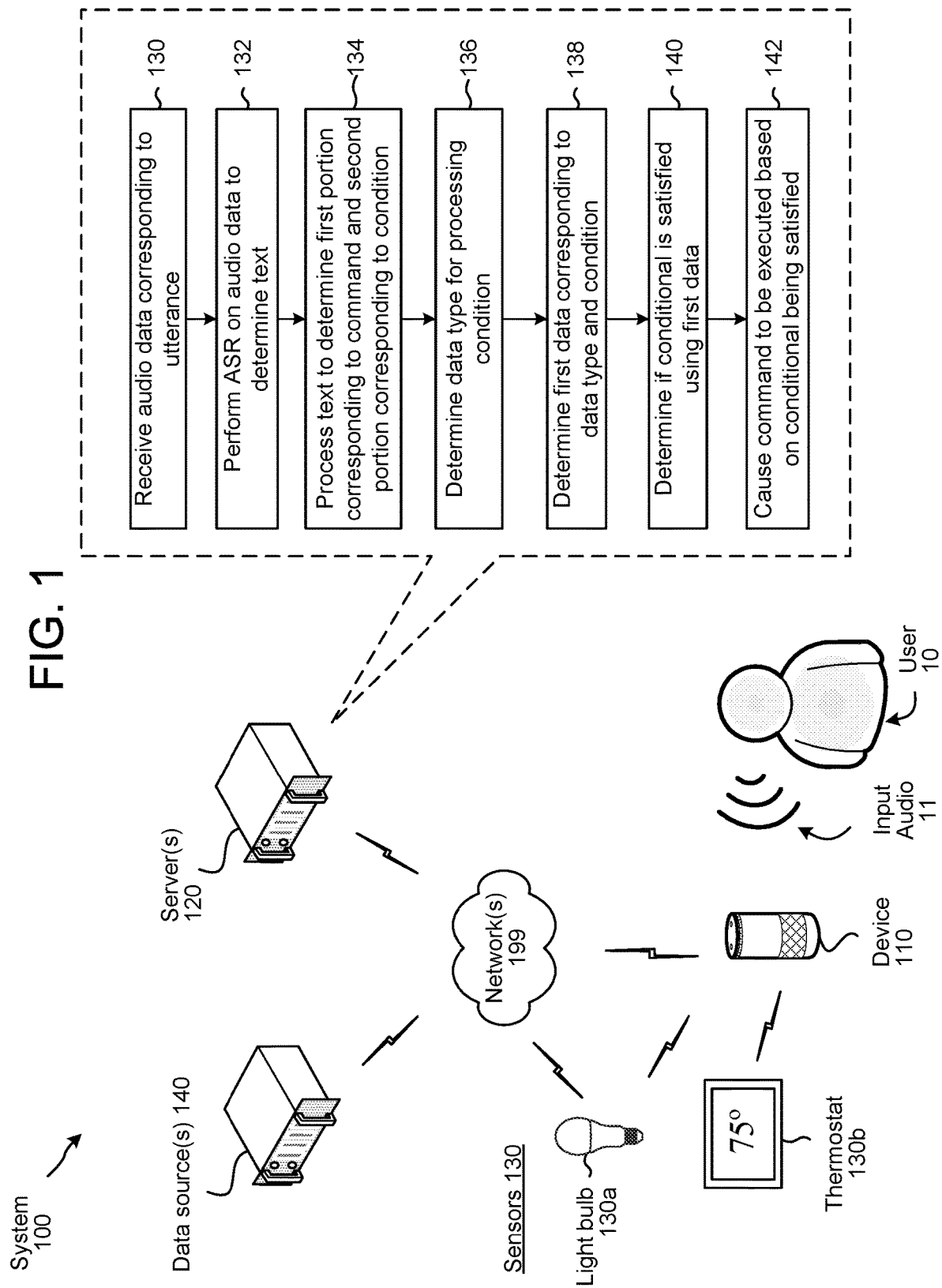

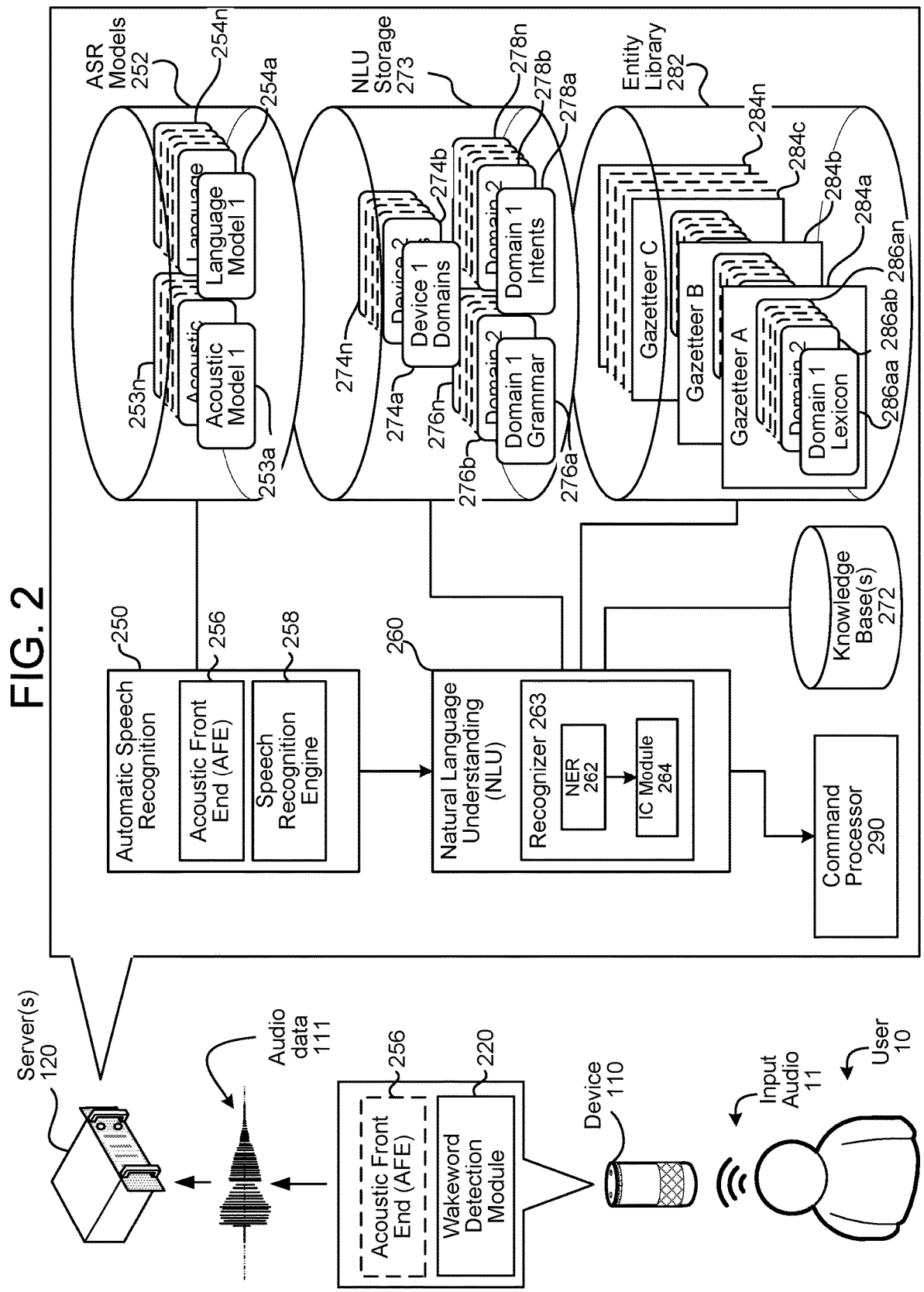

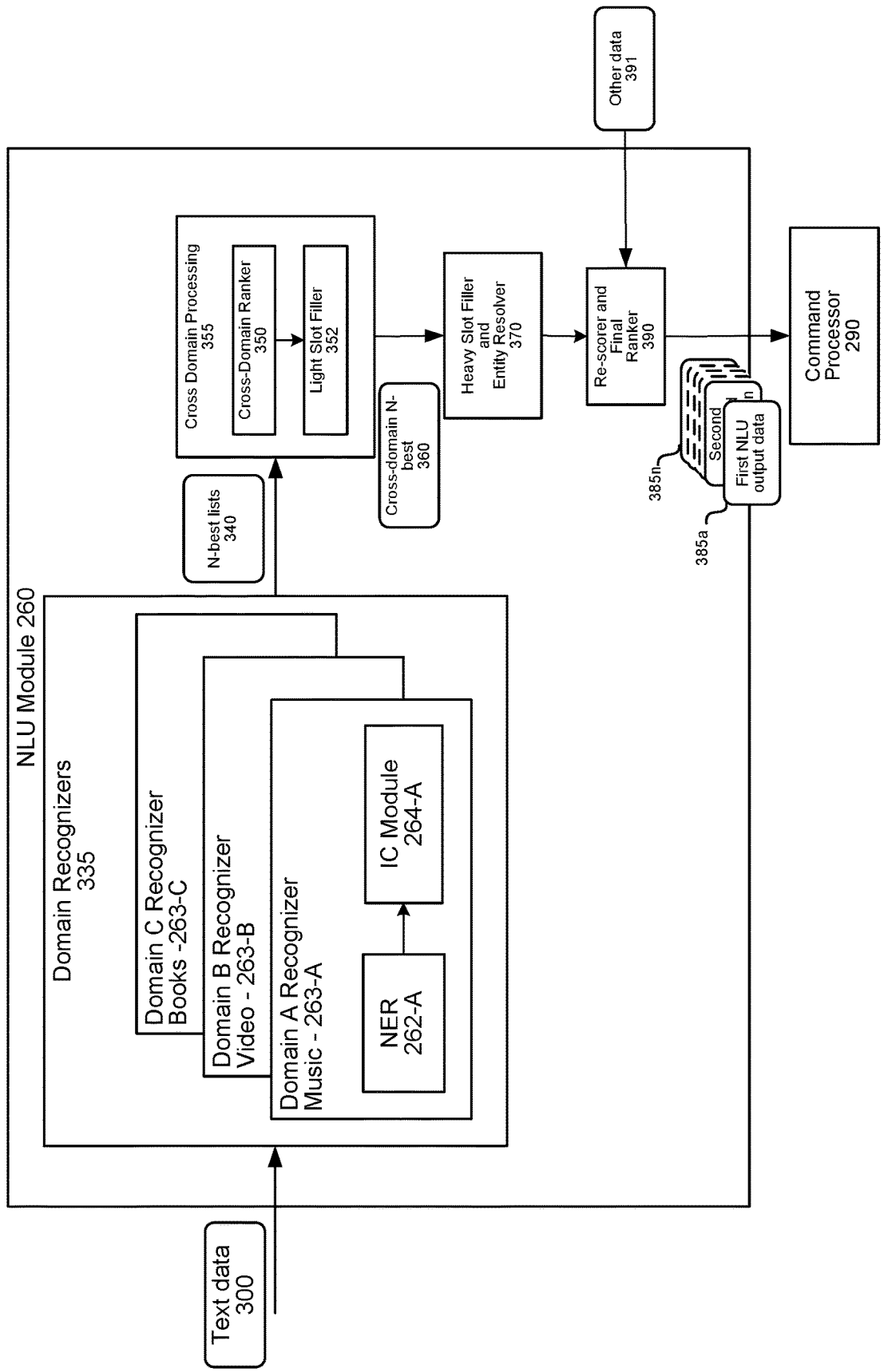

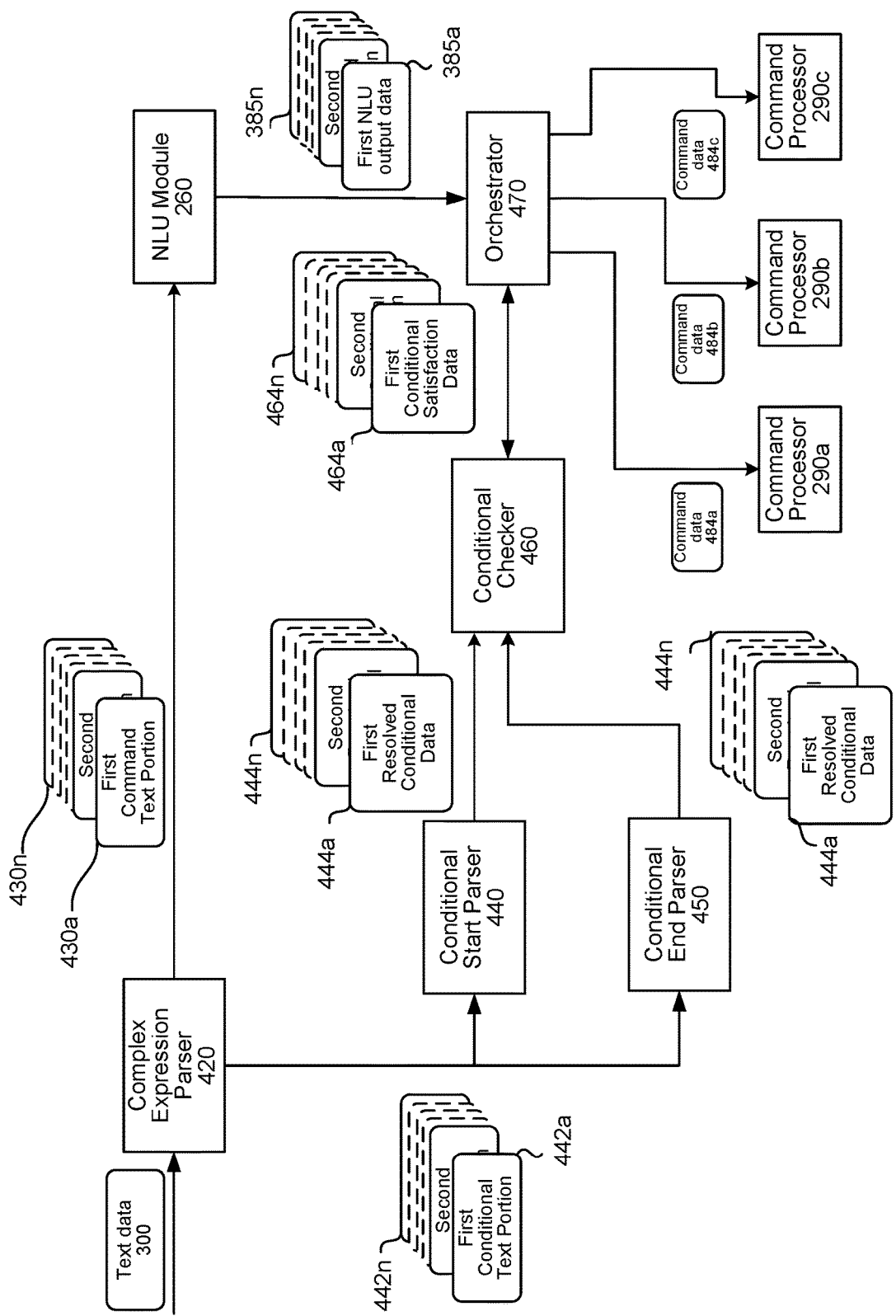

PROCESSING COMPLEX UTTERANCES FOR NATURAL LANGUAGE UNDERSTANDING

CROSS-REFERENCE TO RELATED APPLICATION DATA

This application is a divisional application of and claims the benefit of priority of U.S. patent application Ser. No. 15/280,430, filed Sep. 29, 2016, and entitled "PROCESSING COMPLEX UTTERANCES FOR NATURAL LANGUAGE UNDERSTANDING," in the names of Cengiz Erbas, et al. The above application is herein incorporated by reference in its entirety.

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and/or natural language understanding techniques is referred to herein as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system for configuring and operating a system to parse complex incoming utterances according to embodiments of the present disclosure.

FIG. 2 is a conceptual diagram of components of a speech processing system according to embodiments of the present disclosure.

FIG. 3 is a conceptual diagram of a system architecture for parsing incoming utterances using multiple domains according to embodiments of the present disclosure.

FIGS. 4A and 4B are conceptual diagrams of a system architecture for parsing complex incoming utterances according to embodiments of the present disclosure.

DETAILED DESCRIPTION

Figure 4B:
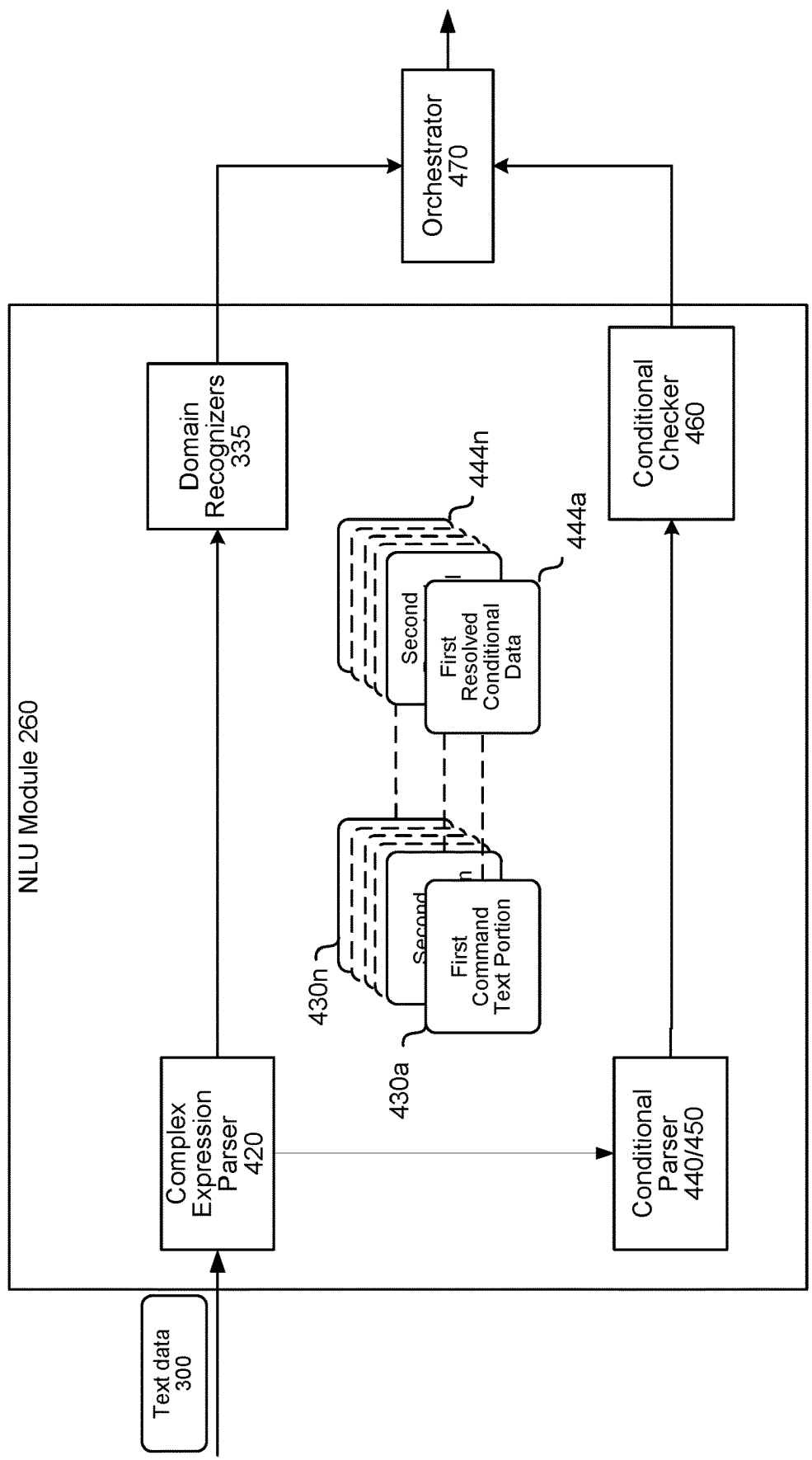

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used when performing speech processing. Such a distributed environment may involve a local device having one or more microphones being configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

As can be appreciated, natural language understanding involves a complex analysis of text (which may be obtained either from a spoken utterance or from some other source) and potentially other data to determine the text's precise meaning. The process of identifying the intent of an utterance (i.e., the ultimate desired result of the query) may be referred to as intent classification. The process of identifying an entity in an utterance is a two stage processes where the first stage, entity recognition, involves identifying a mention of an entity in query text needed to complete the intent (sometimes called slots) and the second stage, called entity resolution, actually matches the text of the entity to a specific entity known to the system.

NLU processing systems may employ a multi-domain architecture where each domain represent a certain subject area for a system. Example domains include weather, music, shopping, etc. Each domain may be configured with its own intents, slot structure, or the like as well as its own logic or other components needed to complete the NLU processing for a particular query.

During runtime processing, a speech processing system may process data representing a single utterance using multiple domains at the same time, or otherwise substantially in parallel. As the system may not know ahead of time what domain should be associated with the utterance until each domain's processing of the utterance is complete (or at least partially complete), the system may process text data representing an utterance substantially simultaneously using models and components for different domains (e.g., books, video, music, etc.). The results of that parallel processing may be ranked, with the highest ranking results being executed/returned to the user.

Current NLU systems may only be capable of processing single-intent utterances. That is, a system may be able to process an utterance such as "play music" but may have difficulty with multiple intent-utterances such as "play music and turn on the lights." While a system may be configured to handle a multiple-turn dialog in the context of a single command (e.g., first utterance: "play music," system response "what would you like to play," second utterance "Adele"), such multiple turn dialogs happen over the context of multiple utterances related to as single domain/command. A single utterance that includes multiple intents or commands may not be processed correctly, and if an utterance includes multiple commands, only one command of the utterance may be executed. A single utterance may be considered to be a single statement that is preceded by a wakeword, or a single statement that is captured and processed as a discrete utterance by the system (such as a turn in a multiple turn dialog).

Further, present NLU systems may not be configured to handle other complex utterance constructions such as conditional utterances which include single utterances that include both a command portion and a conditional portion that recites some condition that should govern execution or termination of the command portion. For example, a conditional utterance may include a request to execute a command when a certain condition is satisfied, such as "play music at 6 pm" or "play music if it is raining." Another example of a complex utterance is a repetitive utterance, e.g., an utterance that includes a request to continue execution of a command until a certain condition is satisfied, such as "play music until 6 pm." Further, complex utterances may include combinations of the above such as "set a timer for 10 minutes and play music until 6 pm."

To improve system performance, offered is a system that can process complex utterances such as sequential utterances (e.g., utterances including multiple commands), conditional utterances and repetitive utterances. Various techniques such as rules, machine learning trained models, or the like, are used to configure the system to detect when an incoming utterance has a complex construction. The system may also be configured to sequential utterances by different domains either sequentially or in parallel so the system causes the multiple commands in an utterance to be executed. The system may also be configured to determine when a conditional or variable statement in an utterance is satisfied, by identifying the data needed to check the conditional, analyzing the data, and executing (or not) the command based on the testing of the conditional data.

FIG. 1 shows a system 100 configured to perform NLU processing. Although FIG. 1, and other figures/discussion, illustrate the operation of the system in a particular order, the steps described may be performed in a different order (as well as certain steps removed or added) without departing from the intent of the disclosure. As shown in FIG. 1, a system 100 may include one or more devices 110 local to user(s) 10, as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server may be capable of performing all speech processing or multiple server(s) 120 may combine to perform the speech processing. Further, the server(s) 120 may be configured to execute certain commands, such as answering queries spoken by user 10, or to pass data related to commands to other devices (such as servers associated with command processors 290) to cause execution of the commands. In addition, certain speech detection or command execution functions may be performed by device 110.

As shown in FIG. 1, a system may receive (130) audio data corresponding to an utterance. A single utterance may include a single statement in input audio 11 made by a user to the system. The single utterance may include multiple commands (as indicated below) that may be processed by the system. The system may then perform (132) ASR on the audio data to determine text. The system may then process (134) the text to determine multiple portions of the text. For example, a first portion of the text may correspond to a command and a second portion of the text may correspond to a conditional statement that may relate to when the command should be executed. In another example, a first portion of the text may correspond to a first command and a second portion of the text may correspond to a second command. The text may also include multiple other portions corresponding to multiple different commands and/or conditionals as part of a single utterance. The system may determine which conditional statement corresponds to which command of the utterance. This may be done using various rules and/or trained models as discussed below.

The system may determine (136) a data type for processing a conditional statement. The data type corresponds to what data the system should process to determine if the conditional is satisfied. For example, if the conditional included the text "if it is raining" the data type may be weather data. If the conditional included the text "at six o'clock" the data type may be time data. Multiple data types may also be determined. For example, if the conditional included the text "until 10 minutes after the dishwasher cycle ends" the data type may include appliance data and time data or if the conditional included the text "if it is raining when I get home" the data type may include weather data and user location data.

The system may then determine (138) first data corresponding to the data type and/or the conditional statement. For example, the system may determine that weather data is the data type, but must determine what weather data is appropriate for the conditional statement. If the conditional statement included "if it is raining at home" the system may first identify a location for "home" (for example, using a user profile 604) and then identify weather data corresponding to the location of home. If the conditional statement included a statement "if the lights are on in the living room" the system may first identify the living room lights (for example, using a user profile 604 to identify the light bulb 130*a* as corresponding to the living room) and may then check the data corresponding to the living room lights (e.g., light bulb 130*a*) to determine if the lights are on or off. As can be appreciated, many different data sources may be used by the system to obtain such data. Certain data sources 140 may be internet or web available sources such as weather services, news services, websites, or other data sources. Other data sources may be sensors 130 that are associated with user 10 (for example, through a user profile 604). For example, while processing conditional text "if the temperature downstairs is 75 degrees or higher" the system may determine that thermostat data is needed to resolve the conditional (i.e., determine whether the conditional is satisfied). The system may then identify, using the user profile 604, what sensors are associated with the user 10 that can produce thermostat data. The system can then identify which thermostat 130*b* is associated with "downstairs" and identify (138) the data associated with that thermostat. Data from sensors 130 may be pushed to the system, for example included in data packet(s) associated with the input audio 11 as part of the same communication session with the system, or in asynchronous side channel communications. Data from sensors 130 (and/or data source(s) 140) may also be pulled by the system, such as after the system determines what data is needed to resolve the conditional statement.

Once the data needed to resolve the conditional is obtained the system may determine (140) if the conditional is satisfied using the first data. The system may then cause (142) the command to be executed based on the conditional data being satisfied. For example, if the start of the command is dependent on the conditional (e.g., "play music when I get home") the system may play music once the first data (in this case time data) indicates that the speaker has returned home. In another example, if the end of the command is dependent on the conditional (e.g., "play music until I get home") the system may play music and may check the first data (in this case time data) until the speaker has returned home, at which point the system may stop the music playback. As can be appreciated the system may cause a command to be executed either by executing the command directly or by sending a signal to another device to execute the command if appropriate. For example, if an utterance included the text "turn the heat up if it is under 70 degrees in here" the system may check thermostat data to test the conditional ("if it is under 70 degrees") and if true may send a signal to a thermostat (130b) to increase a temperature setting. Many such examples are possible.

Many different types of conditionals may be processed by the present system. The system may process positive conditionals where the conditional is satisfied when a certain conditional is true (for example, "turn off the air conditioner when the temperature reaches 70 degrees," "send me a message after the washing machine is done," "when I come home open the garage door" or the like). The system may also process negative conditionals where the conditional is satisfied when a certain conditional is not true (for example, "turn off the heat when I am not home," or the like). The system may also process other types of conditionals.

The system may also be configured to process multiple commands in a single utterance, and to understand what portions of an utterance correspond to what conditional statements. For example, an utterance such as "turn the heat on until it reaches 70 degrees turn on the oven and if I'm not home before 6 send a message to my wife that I'm on my way" may be processed by the system to recognize that the utterance includes three different command portions where one command portion ("turn on the heat") has a conditional statement ("until it reaches 70 degrees") that governs when execution of the command should stop, one command portion ("send a message to my wife that I'm on my way") has a conditional statement that governs when execution of the command should start and another command portion ("turn on the oven") has no conditional statement governing its execution. The various components discussed below are configured using techniques such as rules, trained models, and other logic to allow the system to process multiple commands from a single utterance (or from multiple utterances), to identify within an utterance conditional statements, and to link the conditional statements with the corresponding command portions. By configuring the system in this manner, the system may be robust to various phrasings of complex utterances such as "until _____ do _____," "when _____ do _____," "_____ or _____," "_____ after _____" and/or various combinations thereof. The system may be configured to determine when an order of utterance portions is important, when it isn't, when the utterance includes an "and" situation or an "or" situation, or other such complex utterance parsing considerations. The present system may be configured to process many configurations of complex utterances.

The system is also configured to resolve a conditional statement to determine what data is needed to check if the conditional is satisfied. The system then checks the data and determines whether or not the data indicates that the conditional is satisfied. The system can then coordinate execution of a command (e.g., when to start or end a command) based on whether the conditional is satisfied.

Further details of the NLU processing are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. As shown in FIG. 2, an NLU component may include a recognizer 263 that includes a named entity recognition (NER) module 262 which is used to identify portions of query text that correspond to a named entity that may be recognizable by the system. A downstream process called named entity resolution actually links a text portion to an actual specific entity known to the system. To perform named entity resolution, the system may utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 250 based on the utterance input audio 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom" (which may involve a downstream command processor 290 linked with a telephone application).

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 272.

To correctly perform NLU processing of speech input, an NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 262 receives a query in the form of ASR results and attempts to identify relevant grammars and lexical information that may be used to construe meaning. To do so, the NLU module 260 may begin by identifying potential domains that may relate to the received query. The NLU storage 273 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping", "music", "calendaring", etc. As such, each domain may be associated with a particular recognizer 263, language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result. This is described further in detail below in reference to FIG. 3.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278. Traditionally, the determination of an intent by the IC module is performed using a set of rules or templates that are processed against the incoming text to identify a matching intent.

In order to generate a particular interpreted response, the NER 262 applies the grammar models and lexical information associated with the respective domain to actually recognize a mention one or more entities in the text of the query. In this manner the NER 262 identifies "slots" (i.e., particular words in query text) that may be needed for later command processing. Depending on the complexity of the NER 262, it may also label each slot with a type of varying levels of specificity (such as noun, place, city, artist name, song name, or the like). Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. Each slot/field corresponds to a portion of the query text that the system believes corresponds to an entity. For example, if "play music" is an identified intent, a grammar (276) framework or frameworks may correspond to sentence structures such as "Play (Artist Name)," "Play (Album Name)," "Play {Song name}," "Play (Song name) by (Artist Name)," etc. However, to make resolution more flexible, these frameworks would ordinarily not be structured as sentences, but rather based on associating slots with grammatical tags.

For example, the NER module 262 may parse the query to identify words as subject, object, verb, preposition, etc., based on grammar rules and/or models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as (Artist Name), (Album Name), (Song name), etc. The NER module 262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based (Artist Name), (Album Name), and (Song name), and another framework for the same intent might indicate to attempt to resolve the object modifier based on (Artist Name), and resolve the object based on (Album Name) and (Song Name) linked to the identified (Artist Name). If the search of the gazetteer does not resolve the slot/field using gazetteer information, the NER module 262 may search the database of generic words associated with the domain (in the knowledge base 272). So for instance, if the query was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output data from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

The NLU operations of existing systems may take the form of a multi-domain architecture, such as that illustrated in FIG. 3. In the illustrated architecture, each domain (which may include a set of intents and entity slots that define a larger concept such as music, books etc. as well as components such as trained models, etc. used to perform various NLU operations such as NER, IC, or the like) may be constructed separately and made available to an NLU component 260 during runtime operations where NLU operations are performed on text (such as text output from an ASR component 250). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers 335, where each domain may include its own recognizer 263. Each recognizer may include various NLU components such as an NER component 262, IC module 264 and other components such as an entity resolver, or other components.

For example, a music domain recognizer 263-A (Domain A) may have an NER component 262-A that identifies what slots (i.e., portions of input text) may correspond to particular words relevant to that domain. The words may correspond to entities such as (for the music domain) a performer, album name, song name, etc. An NER component 262 may use a machine learning model, such as a domain specific conditional random field (CRF) to both identify the portions corresponding to an entity as well as identify what type of entity corresponds to the text portion. For example, for the text "play songs by the stones," an NER 262-A trained for a music domain may recognize the portion of text [the stones] corresponds to an entity and an artist name. The music domain recognizer 263-A may also have its own intent classification (IC) component 264-A that determines the intent of the text assuming that the text is within the proscribed domain. An IC component may use a model, such as a domain specific maximum entropy classifier to identify the intent of the text, where the intent is the action the user desires the system to perform.

As illustrated in FIG. 3, multiple domains may operate substantially in parallel, with different domain specific components. That is, domain B for video may have its own recognizer 263-B including NER component 262-B, and IC module 264-B. Domain C for books may also have similar components in its recognizer 3-6, and so on for the different domains available to the system. When input text data 300 (e.g., ASR output text) is received, the same text that is input into the NLU pipeline for domain A 263-A may also be input into the NLU pipeline for domain B 263-B, where the components for domain B 263-B will operate on the text as if the text related to domain B, and so on for the different NLU pipelines for the different domains. Each domain specific NLU pipeline will create its own domain specific NLU results, for example NLU results A (for domain A), NLU results B (for domain B), NLU results C (for domain C), and so on. The different NLU results may then be ranked and further processed using other downstream components as explained below.

As shown in FIG. 3, an NER components 262 and IC module 264 may be considered part of a recognizer (such as recognizer 263-A, 263-B, etc.). The recognizers may operate using machine learning trained models such as a CRF, maximum entropy classifier, neural network (such as a deep neural network (DNN) or recurrent neural network (RNN) or other classifier. The recognizers 335 may also use rules that operate on input query text in a particular form to identify named entities and/or intents. The recognizers 335 may also operate using a data structure such as a finite state transducers (FST) to process the query text to perform NER and/or IC. Other techniques or models may also be used to perform NER and/or IC. The techniques may also be used together. For example a set of rules, an FST and a trained machine learning model may all operate on input text substantially in parallel to determine the named entities/ intents of an input utterance. If one technique performs its task with high enough confidence, the system may use the output of that technique over the others. The system may also prioritize the results of different techniques in certain circumstances (for example rules results may be higher priority than FST results may be higher priority than model results, or some other configuration). Each recognizer (such as 263-A, 263-B, 263-C . . . ) may have its own rules, FSTs and/or models operating such that each recognizer operates substantially in parallel to the other recognizers to come up with its own interpretation of the input text.

The output of each recognizer is a N-best list of intents and identified slots representing the particular recognizer's top choices as to the meaning of the input query text, along with scores for each item in the N-best list. For example, for input text 300 of "play poker face by lady gaga," the music domain recognizer 263-A may output an N-best list in the form of:

[0.95] PlayMusicIntent ArtistName: Lady Gaga Song-Name: Poker Face
[0.02] PlayMusicIntent ArtistName: Lady Gaga
[0.01] PlayMusicIntent ArtistName: Lady Gaga Album-Name: Poker Face
[0.01] PlayMusicIntent SongName: Pokerface where NER component 262-A of recognizer 263-A has determined that for different items in the N-best list the words "poker face" correspond to a slot and the words "lady gaga" correspond to a slot. (Though different items in the N-best list interpret those slots differently, for example labeling "poker face" as a song name in one choice but labeling it as an album name in another.) The IC module 264-A of recognizer 263-A has also determined that the intent of the input query is a PlayMusicIntent (and selected that as the intent for each item on the music N-best list). The recognizer 263-A also determined a score for each item on the list representing the recognizer's confidence that the particular item is correct. As can be seen in the example, the top item has the highest score. Each recognizer of the recognizers 335 may operate on the input query text substantially in parallel, resulting in a number of different N-best lists, one for each domain (e.g., one N-best list for music, one N-best list for video, etc.). The size of any particular N-best list output from a particular recognizer is configurable and may be different across domains.

While the recognizers 335 perform NER, that is they may identify words of the input query text that are important for downstream processing (sometimes called light slot filling), and may even label those words according to type (such as artist name, album name, city, or the like), the recognizers 335 may not perform entity resolution (i.e., determining the actual entity corresponding to the words of the input query text). Entity resolution may be a higher latency process and involves communications with a knowledge base 272 or other component to precisely identify the specific entities. As this process is resource intensive, it may be preferable to not perform this task for each item of every N-best list across the multiple domains as some items have low scores and are unlikely to be used and any resources spent performing entity resolution would be wasted on low scoring items. Thus, a filtering of potential results may first be performed before engaging in more resource intensive processing. To that end, the cumulative N-best lists 340 may be passed to the cross domain processing component 355 which may then further rank the individual items on the N-best list as well as perform other operations.

The cross domain processing component 355 may include a cross-domain ranker 350. The cross-domain ranker 350 takes the group of N-best lists 340 and selects from among the lists the top choices to create a new N-best list that may include items from different domains, but only includes the highest scoring ones of those domains. The purpose of the cross-domain ranker 350 is to create a new list of top scoring potential results, so that downstream (more resource intensive) processes may only operate on the top choices.

As an example of a multi-domain N-best list created by the cross-domain ranker 350, take the example input query text 300 of "play the hunger games." The text may be processed by each of the recognizers 335, and each will output an N-best list, resulting in a group of N-best lists 340 input into the cross domain processing component 355. The cross-domain ranker 350 may then rank the individual items among the N-best lists to create a new N-best list. For example, the cross-domain ranker 350 may output an N-best list in the form of:

[0.78] Video PlayVideoIntent VideoName: The Hunger Games
[0.13] Books ReadBookIntent BookName: The Hunger Games
[0.07] Music PlayMusicIntent AlbumName: Hunger Games where the top items from different N-best lists from multiple domains are grouped into a single N-best list 360. As shown, the top scoring item is from the video domain 263-B, includes the intent "playvideointent" and a slot labeled as video name corresponding to the text "the hunger games." The next item is from the books domain 263-C, includes the intent "readbookintent" and a slot labeled as book name corresponding to the text "the hunger games." Each item in the N-best list 360 may also include a score. The size of the cross domain N-best list 360 is configurable.

While the cross-domain ranker 350 takes as input the N-best lists 340, it may also consider other information, such as other data 391.

The cross domain processing component 355 may also include a light slot filler component 352. This component can take information from slots and alter it to make the data more easily processed by downstream components The operations of the light slot filler component 352 may be low latency operations that do not involve heavy operations such as reference to a knowledge base. The purpose of the light slot filler component 352 is to replace words with other words or values that may be more easily understood by downstream components. For example, if an input query text included the word "tomorrow" the light slot filler component 352 may replace the word "tomorrow" with an actual date for purposes of downstream processing. Similarly, a word "CD" may be replaced by a word "album." The replaced words are then included in the cross domain N-best list 360.

The N-best list 360 is then output to a heavy slot filler and entity resolution component 370. This component 370 can apply rules or other instructions to standardize labels or tokens from previous stages into an intent/slot representation. The precise transformation may depend on the domain (for example, for a travel domain a text mention of "Boston airport" may be transformed to the standard BOS three-letter code referring to the airport). The resolver 370 can refer to an authority source (such as a knowledge base 272) that is used to specifically identify the precise entity referred to in the entity mention identified in the incoming text. Specific intent/slot combinations may also be tied to a particular source, which may then be used to resolve the text (such as by providing information or a command to be executed in response to a user query). For example, in the example, "play songs by the stones," the resolver 370 may reference to a personal music catalog, Amazon Music account, user profile 604, or the like. The output from the entity resolution component 370 may include an altered N-best list that is based on the cross-domain N-best list 360 but also includes more detailed information about the specific entities mentioned in the text (such as specific entity IDs) and/or more detailed slot data that can eventually be used by a command processor 290 which may be incorporated into the same system components or pipeline or may be on a separate device in communication with the system. While illustrated as a cross-domain resolver, multiple resolution components 370 may exist were a particular resolution component 370 may be specific for one or more domains.

As can be appreciated, the entity resolver 370 may not necessarily be successful in resolving every entity and filling every slot. This may result in incomplete results in the combined N-best list. The final ranker 390 may consider such errors when determining how to rank the ultimate results for potential execution. For example, if an item one of the N-best lists comes from a book domain and includes a read book intent, but the entity resolver 370 cannot find a book with a title matching the input query text, that particular result may be re-scored by the final ranker 390 to be given a lower score. Each item considered by the final ranker 390 may also be assigned a particular confidence, where the confidence may be determined by a recognizer 335, cross domain processor 355 or by the final ranker 390 itself. Those confidence scores may be used to determine how to rank the individual NLU results represented in the N-best lists. The confidence scores may be affected by unfilled slots. For example, if one domain is capable of filling a slot (i.e., resolving the word in the slot to an entity or other recognizable form) for an input query the results from that domain may have a higher confidence than those from a different domain that is not capable of filling a slot.

The final ranker 390 may be configured to apply re-scoring, biasing, or other techniques to obtain the most preferred ultimate result. To do so, the final ranker 390 may consider not only the NLU results of the N-best lists, but may also consider other data 391. This other data 391 may include a variety of information. For example, the other data 391 may also include application rating or popularity. For example, if one application has a particularly high rating, the system may increase the score of results associated with that particular application. The other data 391 may also include information about applications have been specifically enabled by the user (as indicated in a user profile 604, discussed below in reference to FIG. 6). NLU results from enabled applications may be scored higher than results from non-enabled applications. User history may also be considered, such as if the user regularly uses a particular supplemental application or does so at particular times of day. Date, time, location, weather, type of device 110, customer ID, context and other information may also be considered. For example, the system may consider when any particular applications are currently active (such as music being played, a game being played, etc.) between the system and device 110. The highest scoring result (or results in the case of multiple commands being in an utterance) may be passed to a downstream command processor 290 for execution.

Following final ranking, the NLU module 260 may output NLU output data 385. The NLU output data 385 may include an indicator of the command to be executed along with data associated with the command, for example an indication that the command is "play music" and the music to be played is "Adele." The NLU output data 385 may be in the form of previous NLU data such as item(s) N-best list 340, item(s) in cross-domain N-best list 360, or the like. The NLU output data 385 may also be in a format executable by the command processor 290, e.g., similar to command data 484. Multiple instances of NLU output data (e.g., 385*a*-385*n*) may also be output.

While in certain systems the NLU output data 385 may only correspond to a single command, it may be desirable to configure the system to process complex utterances that may actually call for multiple different commands (potentially from different domains) to be executed, may call for commands to be executed under different conditions, or may call for other complex interpretations. Thus, for the present system, the NLU output data 385 may include information for multiple commands. The present system may enable processing of complex expressions in order to create NLU output data corresponding to multiple commands. For example, the system may be configured to not only process a single command per utterance such as "dim the kitchen lights," but also a multiple utterance command such as "dim the kitchen lights, then set the thermostat to 65 degrees Fahrenheit." The system may also be configured to process an expression that has a conditional attached to the start of the command execution such as play "Frank Sinatra if it is raining outside." The system may also be configured to process an expression that has a conditional attached to the end of the command execution such as "Alexa, play Let it be by the Beatles three times" or "Alexa, repeat playing Bolero until 10 pm."

To process complex utterances a system may be configured with a complex expression parser 420, as shown in FIG. 4A. The various components of FIG. 4A, such as complex expression parser 420, may be separate components as illustrated or may be included in other components, such as within an NLU module 260. The complex expression parser 420 may operate to determine if incoming text data 300 includes multiple commands, if incoming text data 300 includes a conditional statement, and what command portion the conditional statement applies to. The complex expression parser 420 may operate using a combination of rules and trained machine learning models to identify command portions (e.g., portions of text that indicate a request to execute a command), to identify conditional statements (e.g., portions of text that indicate a condition that impacts execution of a command portion) and/or to identify multiple command portions in a single utterance.

The rules may incorporate specific formations of command requests and conditional statements. For example, a rule may recognize that a form of an utterance of "[first portion] if [second portion]" may indicate a command in the first portion and a conditional statement in the second portion, where initiation of the command is dependent on the conditional statement being true. In another example, another rule may recognize that a form of an utterance of "[first portion] until [second portion]" may indicate a command in the first portion and a conditional statement in the second portion, where completion of the command is dependent on the conditional statement being true (i.e., the command is executed until the condition is satisfied). In another example, another rule may recognize that a form of an utterance of "[first portion] and [second portion]" may indicate a first command in the first portion and a second command in the second portion. Note that discussions of "first portion," "second portion" or the like are not intended to imply a required order of portions in an utterance. Indeed the system may be configured to recognize utterances where the command portion comes before or after the corresponding conditional portion, and indeed where multiple command portions and/or conditional portions are included. Use herein of terms such as "first," "second," "third," etc. are meant to distinguish portions from each other rather than to imply any order of the portions within an utterance. Many other examples of rules may be envisioned that configure the system to recognize multiple commands in a single utterance, or conditional statements and command portions in a single utterance.

The system may also incorporate one or more trained machine learning models that can be used to process the text data 300 to identify one or more command portions and/or one or more conditional statements. The trained models may also determine what command portion(s) a particular conditional statement applies to. The models may be trained using training corpus(es) including many different examples of complex utterance configurations so that the system can recognize and parse multiple command utterances and/or conditional command utterances. The system may use a single model capable of processing the incoming text data 300 to identify multiple command/conditional utterances. Or the system may use multiple different models, for example one model to identify multiple command utterances, another model to identify utterances where a command start depends on a conditional statement, and still another model to identify utterances where a command end depends on a conditional statement. In such a multi-model configuration, the models may operate in series or in parallel on the text data 300 to identify the differ portions of the text data 300 and how they correspond to a multiple command/conditional utterance.

The rules and/or models may be operated by the complex expression parser 420, which may determine when the text 300 includes multiple command portions and/or when the text 300 includes a conditional statement. The complex expression parser 420 may thus be configured to recognize when a conditional statement or multiple commands appear in the text data 300. The complex expression parser 420 may output an indication as to what portions of the text 300 correspond to command portion(s) and what portions of the text 300 correspond to conditional statement(s). The complex expression parser 420 may output one or more indications that indicate the type of the complex utterance corresponding to the text 300. For example, if multiple commands are included in the text data 300 the complex expression parser 420 may output an indication that the text data 300 includes multiple commands, as well as how many commands are included in the utterance, as represented by the text data 300. The complex expression parser 420 may also output an indication if a conditional statement is detected, as well an indication as to what command portion is linked to the conditional statement. The complex expression parser 420 may also indicate whether the conditional is linked to the start of the command, the end of the command, or some other aspect of the command.

The complex expression parser 420 may also be configured to separate the text 300 into portions and to send the portions to an appropriate further component. For example, the complex expression parser 420 may be configured to identify command portions of the utterance text and to separate those command portions 430 and send them to the NLU module 260. If a command portion 430 is associated with a conditional statement, the system may track that, for example using indications output by the complex expression parser 420. For example, data linking a command portion 430 with a conditional text portion 442 may be output by the complex expression parser 420 and tracked by the system, for example using orchestrator 570.

If the utterance included only multiple command portions but no conditional portions, the command portions may be processed by the NLU module 260, resulting in NLU output data 385 corresponding to the command text portions 430. The NLU output data 385 may include processed NLU data for multiple different commands. The NLU output data 385 may be sent to the orchestrator, which may use the NLU output data 385 to determine which command processor 290 is appropriate for the particular command. The orchestrator may then send command data 484 to the appropriate command processor 290 to cause execution of the command(s).

The complex expression parser 420 may determine and then isolate portions of text corresponding to conditional statements. Those text portions 442 may be send to other components for further processing. Thus, while the complex expression parser 420 may be configured to identify portions of text that include conditional statements (442), the complex expression parser 420 may not necessarily be configured to understand the meaning behind those conditional statements. The task of resolving (e.g., determining the meaning of) the conditional statements may fall to components such as the conditional start parser 440 and conditional end parser 450. The conditional start parser 440 may be configured to resolve conditional statements that impact the beginning of a command whereas the conditional end parser 450 may be configured to resolve conditional statements that impact the end of a command. Or the conditional parsers 440 and 450 may be incorporated into a single component.

The conditional parsers 440 and 450 are configured to process the text of a conditional text portion 442 to identify what data type, data value, or other associated data should be analyzed to determine if and/or when the conditional is satisfied. This output may form the resolved conditional data 444. For example, if a conditional statement included text such as "if it raining in Hawaii", a parser 440 or 450 may determine output resolved conditional data 444 that indicates the data type needed is "weather data," data value is "raining" and other associated data in this example may be "location: Hawaii." In another example, if a conditional statement included text such as "for five minutes", a parser 440 or 450 may determine output resolved conditional data 444 that indicates that the data type needed is "time data," data value is "[current time]+5 minutes" and other associated data in this example may be the current time the utterance was received, for example "6:03 pm." The resolved conditional data 444 may include data such as an indication of a data type needed to check the conditional, data location of data needed to check the conditional, link to a user profile where data may be obtained, or other kinds of data. The parsers 440 and 450 may have access to other data sources, such as data sources 140, user profile(s) 604, or other information. Alternatively, the parsers 440 and 450 may only focus on the conditional text portions 442 and may leave it to a downstream component, such as the conditional checker 460 to give value to indictors such as "current time" and "Hawaii." (For example, the parser 440 or 450 may determine that a word corresponding to a location has the text "Hawaii" but the conditional checker 460 may actually determine that the word "Hawaii" corresponds to a location with associated weather data.) As can be appreciated, many different data types, corresponding data values, and/or other associated data may be determined for different conditional statements. Further, other types of data may be included in the resolved conditional data 444, depending on what information the conditional checker 460 may use to determine if a conditional is satisfied. Depending on the text data 300 being processed, the system may create multiple instantiations of resolved conditional data (e.g., 444a-444n) where each instance may correspond to data needed to check a particular conditional statement of the utterance. The system may also track which conditional applies to which command text portion (for example, 444b may correspond to command text portion 430b) so that the orchestrator 470 or other component may compare the appropriate conditional satisfaction data 464 to execute the appropriate command.

The parsers 440 and 450 may operate using one or more trained machine learning models or other determiners to process the conditional text portions 442 into resolved conditional data 444. The parsers 440 and 450 may be trained on many different examples of conditional text portions and the corresponding data that should be resolved from those examples.

The conditional checker 460 may determine whether a conditional statement is satisfied. The conditional checker 460 may take the resolved conditional data 444 indicating what data types, data values, or other data are used to check the conditional and may obtain the data needed and process it to determine whether the conditional is satisfied. The conditional checker 460 may obtain data used to check the conditional statement from a number of different sources.

Figure 5:
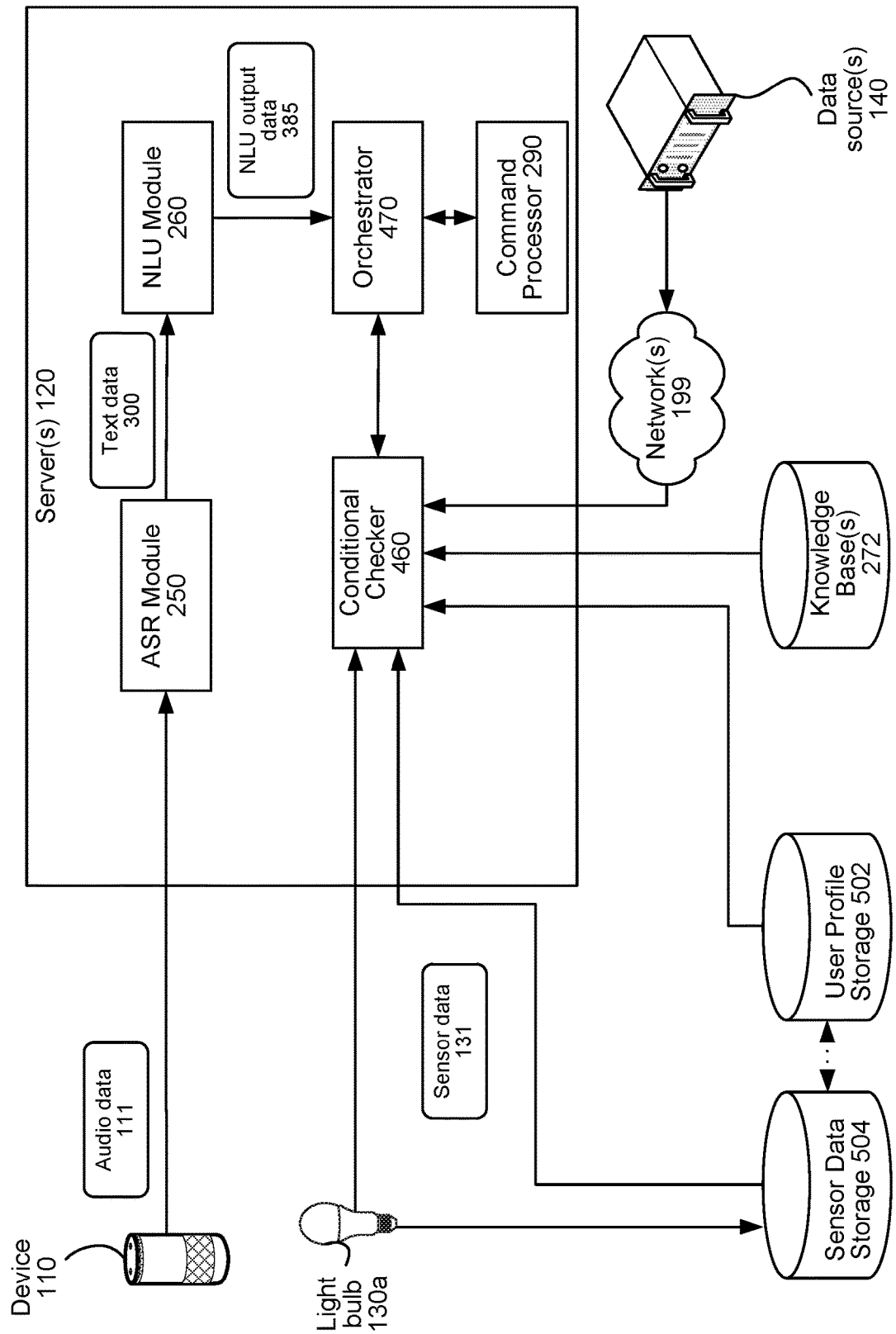
FIG. 5 is a conceptual diagram of a system architecture for parsing complex incoming utterances according to embodiments of the present disclosure.

FIG. 5 illustrates portions of a speech processing system and illustrates how certain data may be obtained by the conditional checker. As shown, the conditional checker 460 may connect with a variety of data source(s) 140, such as internet web sources, data stores, or the like, to a knowledge base(s) 272, or to other data sources not specifically illustrated. Connection to such sources may be direct, over networks(s) 199, or otherwise. The conditional checker 460 may also obtain data from a number of different sensors 130, which may include a variety of different devices such as home electronics, appliances, wearables, mobile devices, home sensors, or other devices capable of producing data. The sensor data may be used in resolving conditional statements such as "if the light is on," "when the dryer is done," "if the heat is on," etc. Communications between the sensors and the system may be two-way, which may also allow the system to adjust the sensors in response to a spoken command.

Sensor data 131 may be sent to the system in an asynchronous manner where sensor data 131 arrives at the system without being tied to a particular utterance. As illustrated, sensor data 131 may be stored in, or communicated to, sensor data storage 504. Data for sensors relating to particular user profiles may be stored in, or associated with, user profile storage 502. For example, a user profile stored in user profile storage 502 may link to particular sensors associated with a user profile (e.g., a laundry machine, light bulb, thermostat, etc.). Sensor data 131 from those sensors may be made available to the conditional checker 460 through a user profile, through the sensor data storage 504, or through other means. Sensor data 131 may be centralized or may be disparate and only obtained from the system (in a pull-type scenario) if needed to check if a particular conditional is satisfied. Or the sensor data 131 may be sent to the system with audio data 111, such as in a situation when the sensor data 131 and audio data 111 are sent together as part of a communication session between device 110 and server 120. The sensor data 131 may include an indicator as to a data type (for example, thermometer data, light bulb data, appliance data, etc.) as well as a data value (for example, 75 degrees, on or off, time left in cycle, etc.). The sensor data 131 may be associated with the incoming audio data 111. The conditional checker 460 may use an indication of the association or other data to determine whether the conditional statement of the utterance is satisfied if the conditional statement depends on sensor data 131 that is reasonably contemporaneous with the audio data 111. Other data that may be relevant to the context of the utterance may also be sent to the conditional checker 460.

The orchestrator 470 is a component that manages commands and coordinates conditional states, NLU output data, and other information to determine what commands are passed to a command processor 290 for execution, the timing of execution, and other such scheduling. Although illustrated as downstream of the conditional checker 460, the orchestrator may coordinate sending of data from the complex expression parser 420 to the conditional parsers 440/450, the sending of data from the conditional parsers 440/450 to the conditional checker 460, or other data management within the system 100. Returning to FIG. 4A, the NLU output data 385 may be sent to the orchestrator 470, which may use the NLU output data 385 to determine which command processor 290 is appropriate for the particular command. For example, a music player may be the command processor 290a for command data 484a corresponding to a music command, but a video player may be command processor 290b for command data corresponding to a video command, and so forth. If the conditional satisfaction data 464 indicates that the conditional is satisfied, the orchestrator 470 may send command data 484 to the appropriate command processor 290 to cause execution of the command (in the case of a command whose start is dependent on the conditional statement) or the orchestrator 470 may send command data 484 to the appropriate command processor 290 to cause execution of the command to cease (in the case of a command whose conclusion is dependent on the conditional statement). As above with the resolved conditional data, depending on how many conditionals are being processed, the system may create multiple instantiations of conditional satisfaction data (e.g., 464a-464n) where each instance may correspond to whether a particular conditional statement of the utterance is satisfied. The system may also track which conditional satisfaction data 464 applies to which command text portion (for example, 464b may correspond to command text portion 430b) so that the orchestrator 470 or other component may compare the appropriate conditional satisfaction data 464 to execute the appropriate command.

Although certain component configurations are illustrated, the various components of the system may be configured and organized in a number of different manners. FIG. 4B illustrates another system architecture for parsing complex utterances. As shown in FIG. 4B the text data 300 that is output by the ASR module 250 is processed by the complex expression parser 420 to determine which portions of text correspond to commands (430) and which portions of text correspond to conditionals (not illustrated). The portions of text corresponding to conditionals are sent to the conditional parser 440/450 which outputs the resolved conditional data (444). The resolved conditional data may include indicators of what data is needed to resolve the particular condition recited in a conditional portion.

For example, if a conditional portion includes the text "if the temperature is 70 degrees" the conditional parser 440/450 may determine if the condition corresponds to the temperature of a particular room, the outdoor temperature of a particular location, etc. The conditional parser 440/450 may then output, as the resolved conditional data 444, an indication of a source of the data that will include the desired temperature information. For example, the indicator may be an identifier of a thermostat (such as one identified in a user profile 604) which will include temperature data that can be checked against the conditional statement. The conditional parser 440/450 may also output an indicator of the condition to be checked against the thermostat's data, for example "temperature=70 Fahrenheit." Thus, the resolved conditional data 444 may, for example, look like <[Thermostat ID 4Xt57]=[temperature=70 Fahrenheit]>. A downstream component, for example the conditional checker 460, may then at some point use the indicators to obtain the data needed to check the condition and may check to see if the condition is satisfied (e.g., if the temperature reading of Thermostat ID 4Xt57=70 Fahrenheit). In another example, if the temperature data corresponds to a temperature request for Boston, the complex expression parser 420 may determine a source of Boston weather data (e.g., Weather.com), an indicator of the location that can be used for the source (e.g., zip code 02210) and may create an indicator of the source of the data that may be something like [Weather.com(02210:temperature)] so that the resolved conditional data 444 may, for example, look like <[Weather.com(02210:temperature)]= [temperature=70 Fahrenheit]>.

In another example, if a conditional portion includes the text "when I return home" the conditional parser 440/450 may determine that the condition corresponds to a location of a speaker, that the speaker is associated with a particular mobile device (e.g., mobile phone, wearable device, etc. indicated in a user profile), and that the speaker's location can be determined based on the location of the mobile device. The conditional parser 440/450 may also determine, for example using the user profile, that a particular location is associated with "home." The conditional parser 440/450 may thus output, as the resolved conditional data 444, an indication of a source of the location data that will indicate the location of the mobile device (and hence the user) and an indication that will include the location of "home" in the user profile. Thus, the resolved conditional data 444 may, for example, look like <[GPS data from device Y42UD7]= [home location 40° 53'12.8"N 73° 59'58.0"W]>. A downstream component, for example the conditional checker 460, may then at some point use the indicators to obtain the data needed to check the condition and may check to see if the condition is satisfied (e.g., if the GPS data from device Y42UD7 is within a certain distance of 40° 53'12.8"N 73° 59'58.0"W). Many other examples of resolved conditional data are possible depending on the conditional statements included in utterances and processed by the system.

As shown in FIG. 4B, the resolved conditional data that corresponds to a particular command (e.g., 444a) may be associated with the corresponding command text portion (e.g., 430a) which includes the portion of the ASR output text 300 that corresponds to the command to be executed. Each set of resolved conditional data may be associate with the corresponding command text portion whose execution depends on the conditional (e.g., resolved conditional data 444b may be associated with command text data portion 430b, resolved conditional data 444n may be associated with command text data portion 430n, and so forth). The determination of which conditional statement (and thus which eventual set of resolved conditional data) corresponds to which command text portion may be determined by the complex expression parser 420 or some other component. The association may be made by creating data that includes references to the respective data to be linked or the data may be linked in a data structure that includes both the command text data portion 430 and the resolved conditional data 444. For example, if an utterance text data 300 included text data of "play music when I get home" the command text portion 430 may include "play music," the conditional text portion 442 may include "when I get home," and the resolved conditional data 444 (using the example above) may include <[GPS data from device Y42UD7]; [home location 40° 53'12.8"N 73° 59'58.0"W]>. Thus, the associated text data portion 430 resolved conditional data 444 may include a data structure in the form of <COMMAND: "play music"; CONDITION: [GPS data from device Y42UD7]=[home location 40° 53'12.8"N 73° 59'58.0"W]>. Other examples are also possible.

The associated command text/resolved conditional data may be sent separately or together to downstream components such as the domain recognizers 335, the conditional checker 460, etc. The output from those components (which may include, for example, N-best lists 340 or NLU output data 385 from the domain recognizers 335 or other components not illustrated or an indication of whether the condition is satisfied or not from the conditional checker 460) may be processed by other components, for example the orchestrator 470, which may reside within the NLU module 260 or may reside separately.

Various machine learning techniques may be used to perform the training of the complex expression parser 420, conditional start parser 440, conditional end parser 440, conditional checker 460, or other components. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

Figure 6:
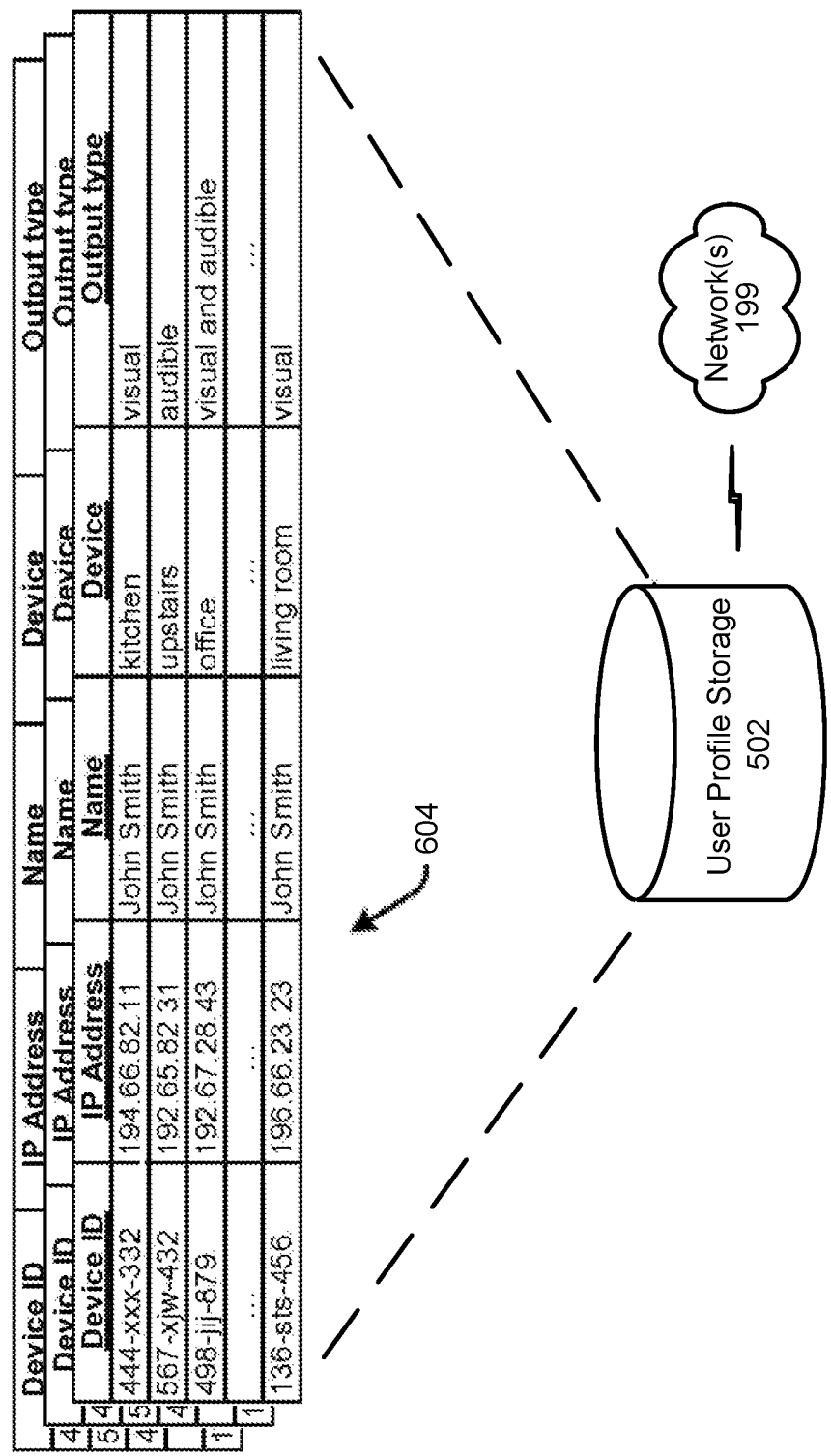
FIG. 6 illustrates data stored and associated with user profiles according to embodiments of the present disclosure.

FIG. 6 illustrates a user profile storage 502 that includes data regarding user profiles 604 as described herein. The user profile storage 502 may be located proximate to the server 120, or may otherwise be in communication with various components, for example over the network 199. The user profile storage 502 may include a variety of information related to individual users, accounts, etc. that interact with the system 100. For illustration, as shown in FIG. 6, the user profile storage 502 may include data regarding the devices associated with particular individual user profiles 604. In an example, the user profile storage 502 is a cloud-based storage. Such data may include device identifier (ID) and internet protocol (IP) address information for different devices as well as names by which the devices may be referred to by a user. Further qualifiers describing the devices may also be listed along with a description of the type of object of the device.

A particular user profile 604 may include a variety of data that may be used by the system. For example, a user profile may include information about what sensors 130 are associated with the user 10 and/or device 110. The profile may also include information about how a particular sensor 130 may be accessed to determine data values from the sensor (e.g., temperature readings, on/off information, etc.). A user profile 604 may also contain a variety of information that may be used to check conditional statements such as address information, contact information, default settings, device IDs, user preferences, or the like.

Figure 7:
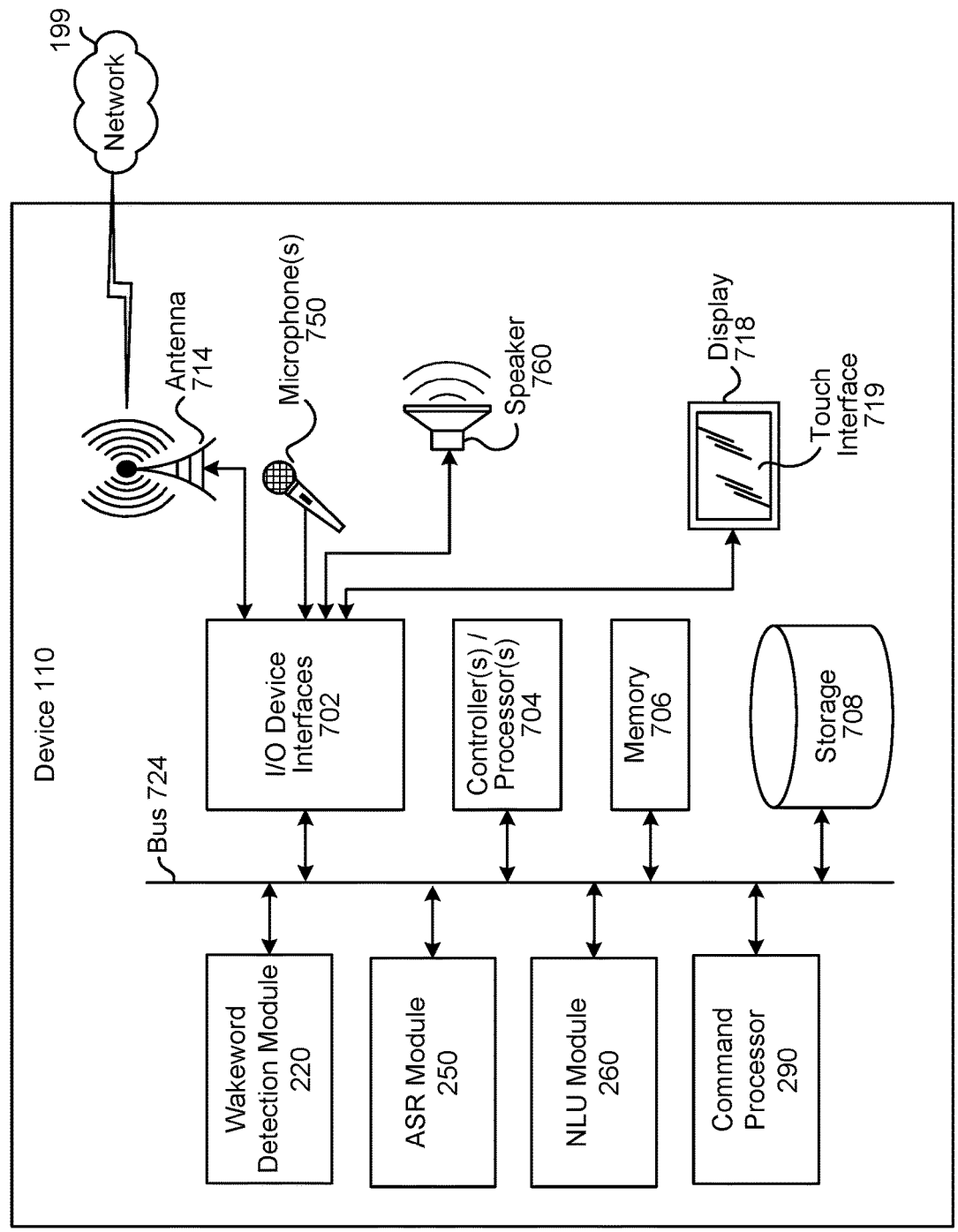
FIG. 7 is a block diagram conceptually illustrating example components of a device according to embodiments of the present disclosure.
Figure 8:
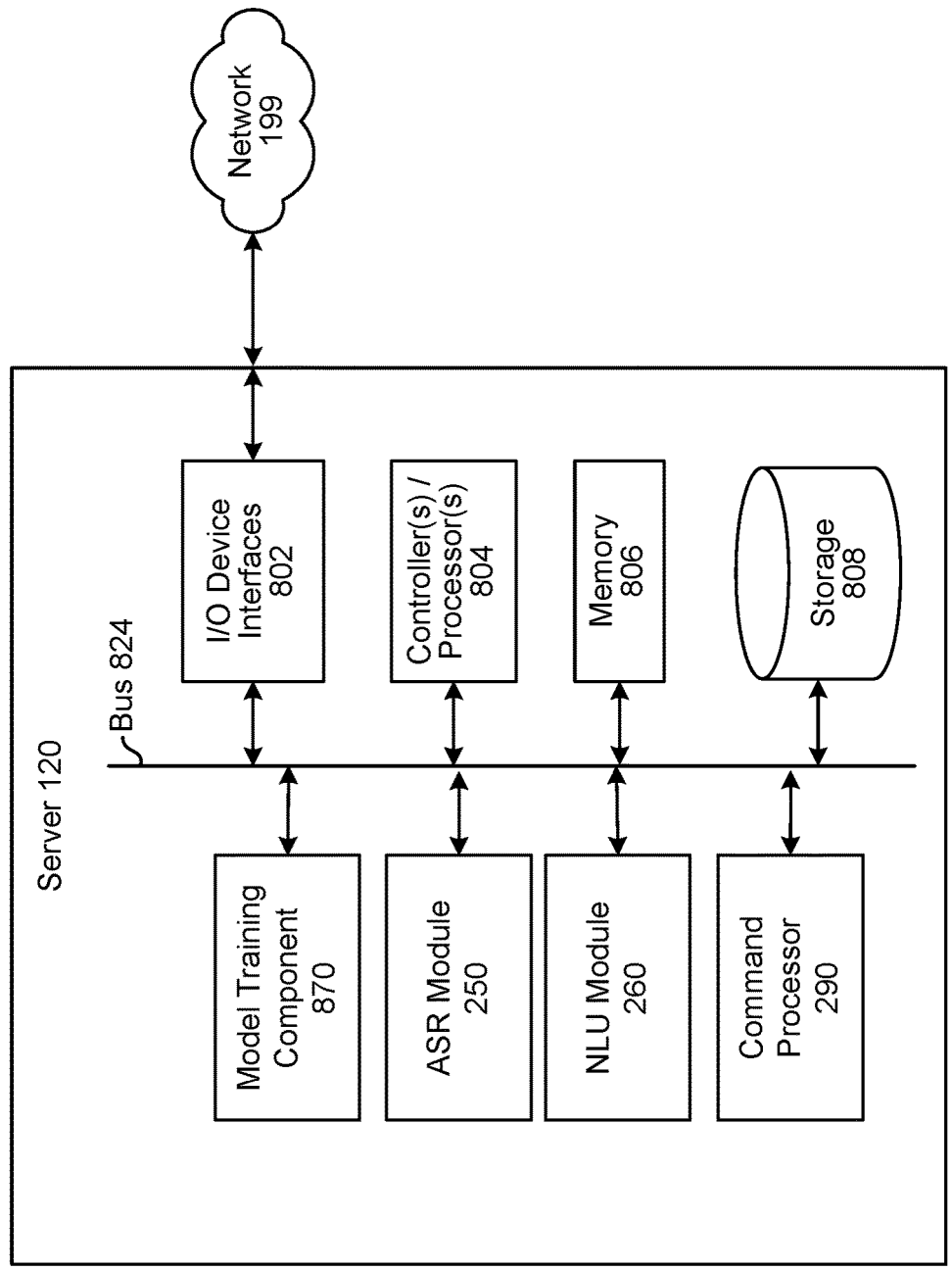
FIG. 8 is a block diagram conceptually illustrating example components of a server according to embodiments of the present disclosure.

FIG. 7 is a block diagram conceptually illustrating a local device 110 that may be used with the described system. FIG. 8 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (704/804), that may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive (MRAM) and/or other types of memory. Each device may also include a data storage component (708/808), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (702/802).

Computer instructions for operating each device (110/120) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120) includes input/output device interfaces (702/802). A variety of components may be connected through the input/output device interfaces, as will be discussed further below. Additionally, each device (110/120) may include an address/data bus (724/824) for conveying data among components of the respective device. Each component within a device (110/120) may also be directly connected to other components in addition to (or instead of) being connected to other components across the bus (724/824).

Referring to the device 110 of FIG. 7, the device 110 may include a display 718, which may comprise a touch interface 719. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 702 that connect to a variety of components such as an audio output component such as a speaker 760, a wired headset or a wireless headset (not illustrated) or other component capable of outputting audio. The device 110 may also include an audio capture component. The audio capture component may be, for example, a microphone 750 or array of microphones, a wired headset or a wireless headset (not illustrated), etc. The microphone 750 may be configured to capture audio. If an array of microphones is included, approximate distance to a sound's point of origin may be performed acoustic localization based on time and amplitude differences between sounds captured by different microphones of the array. The device 110 (using microphone 750, wakeword detection module 220, ASR module 250, etc.) may be configured to determine audio data corresponding to detected audio data. The device 110 (using input/output device interfaces 702, antenna 714, etc.) may also be configured to transmit the audio data to server 120 for further processing or to process the data using internal components such as a wakeword detection module 220.

For example, via the antenna(s), the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported.

Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge base and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio to determine whether the audio corresponds to particular keywords recognizable by the device 110 and/or system 100. The storage 708 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 708 and compare the captured audio to the stored models and audio sequences using audio comparison, pattern recognition, keyword spotting, audio signature, and/or other audio processing techniques.

The server may include a model training component 870. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 7 and 8, are exemplary, and may be located a stand-alone device or may be included, in whole or in part, as a component of a larger device or system.

Figure 9:
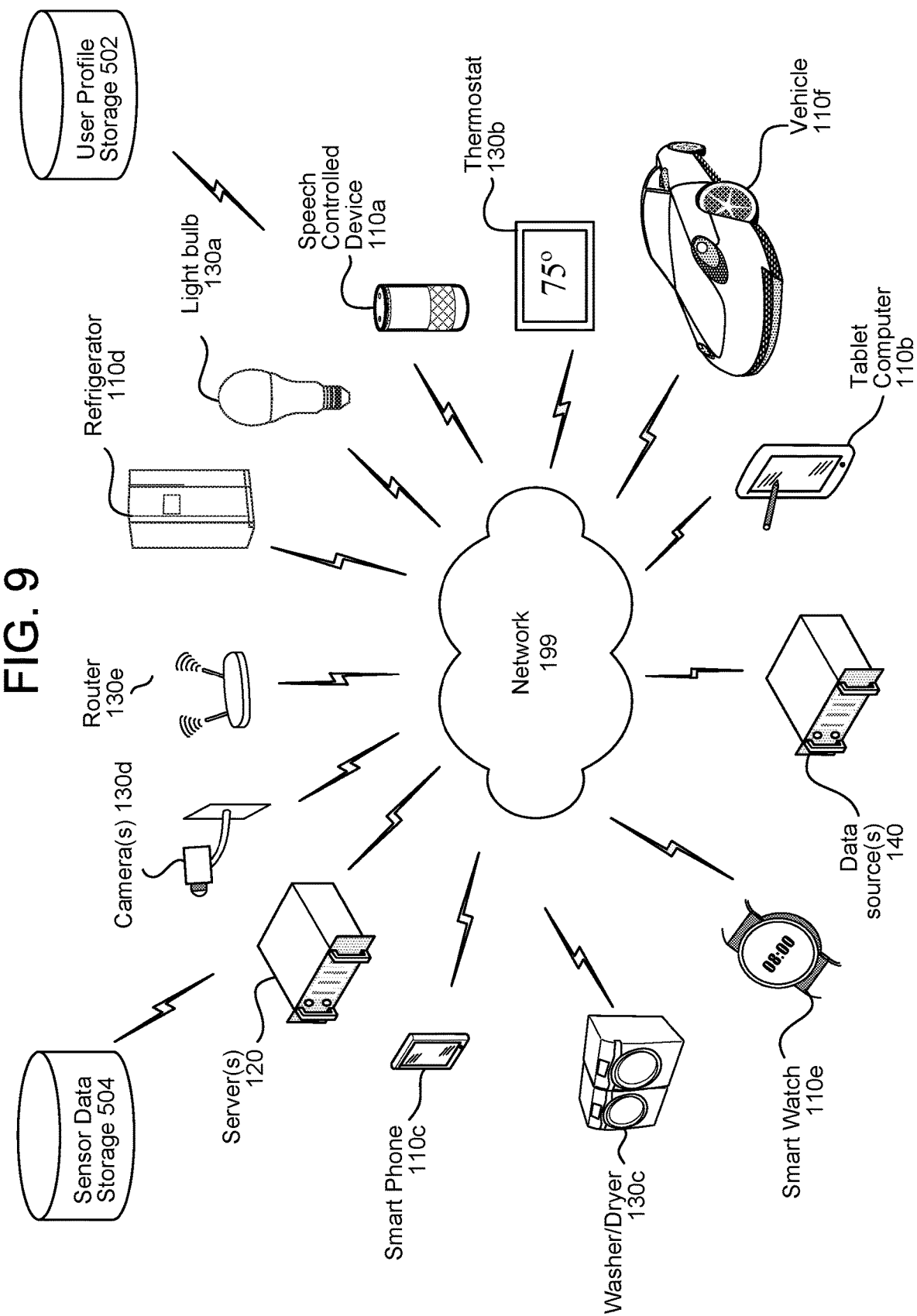
FIG. 9 illustrates an example of a computer network for use with the system.

As illustrated in FIG. 9 multiple devices (120, 120x, 110a to 110f) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 750 or audio capture devices, with processing performed by ASR, NLU, or other components of the same device or another device connected via network 199, such as an ASR 250, NLU 260, etc. of one or more servers 120.

Further, many different sensors, such as light bulb 130a, thermostat 130b, washer/dryer 130c, camera 130d, router 130e, etc. may be connected to the system through network 199. The devices 110, storage 502/504, data sources 140, various sensors 130 may provide data (that may be linked to a user profile 604) to the system for use by the conditional checker 460 (or other component) in determining whether a conditional statement is satisfied.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A system, comprising:
   at least one processor; and
   at least one computer-readable medium encoded with instructions that, when executed by the at least one processor, cause the system to:
      receive audio data corresponding to a first utterance from a first device;
      process the audio data to determine that a first portion of the audio data corresponds to a command and that a second portion of the audio data corresponds to a conditional statement;
      determine that the conditional statement corresponds to a first data type;
      receive, from a second device, first data having the first data type;
      cause, at a first time and based at least in part on the command, at least one component to transition from a first state to a second state;
      determine, using the first data and at a second time after the first time, that the conditional statement is satisfied; and
      cause the at least one component to transition from the second state to the first state based at least in part on the conditional statement being satisfied.

2. The system of claim 1, wherein the at least one computer-readable medium is encoded with additional instructions that, when executed by the at least one processor, further cause the system to:
   determine a user profile associated with the first device; and
   determine that the second device is associated with the user profile.

3. The system of claim 2, wherein the at least one computer-readable medium is encoded with additional instructions that, when executed by the at least one processor, further cause the system to:
   determine that the first data type corresponds to a sensor type; and
   determine that the second device corresponds to the sensor type.

4. The system of claim 1, wherein the at least one computer-readable medium is encoded with additional instructions that, when executed by the at least one processor, further cause the system to:
   determine text data associated with the first portion; and
   associate the text data with a first indicator corresponding to the second device and a second indicator corresponding to a value corresponding to the first data type.

5. The system of claim 1, wherein the at least one computer-readable medium is encoded with additional instructions that, when executed by the at least one processor, further cause the system to:
   receive the first data during a same communication session as the audio data.

6. The system of claim 1, wherein the at least one computer-readable medium is encoded with additional instructions that, when executed by the at least one processor, further cause the system to:
   determine that the first data type corresponds to information available from an internet data source; and
   determine that the second device corresponds to the internet data source.

7. The system of claim 1, wherein the audio data further includes a third portion and the at least one computer-readable medium is encoded with additional instructions that, when executed by the at least one processor, further cause the system to:
   determine that the conditional statement corresponds to the command and not the third portion.

8. The system of claim 7, wherein the at least one computer-readable medium is encoded with additional instructions that, when executed by the at least one processor, further cause the system to:
   determine that the third portion corresponds to a second command; and
   cause the second command to be executed regardless of the conditional statement.

9. A system, comprising:
   at least one processor; and
   at least one computer-readable medium encoded with instructions that, when executed by the at least one processor, cause the system to:
      receive audio data from a first device;
      process the audio data to determine that a first portion of the audio data corresponds to a request to repeat execution of a command and that a second portion of the audio data corresponds to a conditional statement;
      cause the command to be executed multiple times, beginning at a first time;
      determine, at a second time after the first time, that the conditional statement is satisfied; and
      ceasing from further executing the command based at least in part on the conditional statement being satisfied.

10. The system of claim 9, wherein the at least one computer-readable medium is encoded with additional instructions that, when executed by the at least one processor, further cause the system to:
- determine that the conditional statement corresponds to a number of times to repeat execution of the command, wherein the number of times is greater than one;
- determine that the conditional statement is satisfied by determining that the command has been executed the number of times; and
- ceasing from further executing the command based at least in part on the command having been executed the number of times.

11. The system of claim 9, wherein the at least one computer-readable medium is encoded with additional instructions that, when executed by the at least one processor, further cause the system to:
- determine that the conditional statement corresponds to a first time;
- determine that the conditional statement is satisfied at least in part by determining that a current time corresponds to the first time; and
- ceasing from further executing the command based at least in part on the current time corresponding to the first time.

12. The system of claim 9, wherein the first time is a time of day.

13. The system of claim 9, wherein the audio data further includes a third portion and the at least one computer-readable medium is encoded with additional instructions that, when executed by the at least one processor, further cause the system to:
- determine that the conditional statement corresponds to the command and not the third portion.

14. The system of claim 13, wherein the at least one computer-readable medium is encoded with additional instructions that, when executed by the at least one processor, further cause the system to:
- determine that the third portion corresponds to a second command; and
- cause the second command to be executed regardless of the conditional statement.

15. A computer-implemented method, comprising:
- receiving audio data corresponding to a first utterance from a first device;
- processing the audio data to determine that a first portion of the audio data corresponds to a command and that a second portion of the audio data corresponds to a conditional statement;
- determining that the conditional statement corresponds to a first data type;
- receiving, from a second device, first data having the first data type;
- causing, at a first time and based at least in part on the command, at least one component to transition from a first state to a second state;
- determining, using the first data and at a second time after the first time, that the conditional statement is satisfied; and
- causing the at least one component to transition from the second state to the first state based at least in part on the conditional statement being satisfied.

16. The computer-implemented method of claim 15, further comprising:
- determining a user profile associated with the first device; and
- determining that the second device is associated with the user profile.

17. The computer-implemented method of claim 16, further comprising:
- determining that the first data type corresponds to a sensor type; and
- determining that the second device corresponds to the sensor type.

18. The computer-implemented method of claim 15, further comprising:
- determining text data associated with the first portion; and
- associating the text data with a first indicator corresponding to the second device and a second indicator corresponding to a value corresponding to the first data type.

19. The computer-implemented method of claim 15, wherein the audio data further includes a third portion and the computer-implemented method further comprises:
- determining that the conditional statement corresponds to the command and not the third portion.

20. The computer-implemented method of claim 19, further comprising:
- determining that the third portion corresponds to a second command; and
- causing the second command to be executed regardless of the conditional statement.

* * * * *